US012046426B2

(12) United States Patent
Chen et al.

(10) Patent No.: US 12,046,426 B2
(45) Date of Patent: Jul. 23, 2024

(54) KEY MODULE

(71) Applicants: LITE-ON ELECTRONICS (GUANGZHOU) LIMITED, Guangzhou (CN); LITE-ON TECHNOLOGY CORPORATION, Taipei (TW)

(72) Inventors: Chun-Lin Chen, Taipei (TW); Jui-Yu Wu, Taipei (TW); Po-Hsiang Yu, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 17/863,222

(22) Filed: Jul. 12, 2022

(65) Prior Publication Data

US 2022/0351923 A1 Nov. 3, 2022

Related U.S. Application Data

(63) Continuation of application No. 16/931,805, filed on Jul. 17, 2020, now Pat. No. 11,424,091.
(Continued)

(51) Int. Cl.
*H01H 13/06* (2006.01)
*H01H 3/12* (2006.01)
(Continued)

(52) U.S. Cl.
CPC ............ *H01H 13/20* (2013.01); *H01H 3/125* (2013.01); *H01H 13/10* (2013.01); *H01H 13/14* (2013.01);
(Continued)

(58) Field of Classification Search
CPC ...... H01H 3/125; H01H 13/705; H01H 13/14; H01H 13/04; H01H 13/10; H01H 13/70;
(Continued)

(56) References Cited

U.S. PATENT DOCUMENTS 5,630,501 A * 5/1997 Tsay ....................... H01H 3/125 200/344
6,091,036 A * 7/2000 Hu ......................... H01H 3/125 200/344
(Continued)

FOREIGN PATENT DOCUMENTS

CN 201196916 Y 2/2009
CN 104882318 A 9/2015
(Continued)

OTHER PUBLICATIONS

Communication corresponding to Chinese Application No. 202010693338.5 and issued by the China National Intellectual Property Administration on Mar. 17, 2022, 15 pages.

*Primary Examiner* — Ahmed M Saeed
(74) *Attorney, Agent, or Firm* — Innovation Counsel LLP

(57) ABSTRACT

A key module includes a base plate, a circuit layer and a lifting mechanism. The circuit layer is disposed on the base plate. The lifting mechanism is pivotally connected with the base plate relative to the circuit layer, and the lifting mechanism has an abutment element. The abutment element could interfere with the circuit layer to reduce the noise generated by the key module during operation.

21 Claims, 16 Drawing Sheets

Related U.S. Application Data

(60) Provisional application No. 62/875,007, filed on Jul. 17, 2019.

(51) Int. Cl.

| | |
|---|---|
| ***H01H 13/10*** | (2006.01) |
| ***H01H 13/14*** | (2006.01) |
| ***H01H 13/20*** | (2006.01) |
| ***H01H 13/702*** | (2006.01) |
| ***H01H 13/705*** | (2006.01) |
| ***H01H 13/7073*** | (2006.01) |
| ***H01H 13/83*** | (2006.01) |

(52) U.S. Cl.
CPC ........ *H01H 13/702* (2013.01); *H01H 13/705* (2013.01); *H01H 13/7073* (2013.01); *H01H 13/83* (2013.01); *H01H 2219/06* (2013.01); *H01H 2233/07* (2013.01)

(58) Field of Classification Search
CPC ............. H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| | | | | |
|---|---|---|---|---|
| 8,710,383 | B2 * | 4/2014 | Chen | H01H 13/7065 200/5 A |
| 8,890,014 | B1 | 11/2014 | Chen | |
| 2013/0134021 | A1 * | 5/2013 | Chen | H01H 13/83 200/5 A |
| 2013/0334021 | A1 | 12/2013 | Lan | |
| 2018/0277318 | A1 | 9/2018 | Wu | |
| 2019/0019634 | A1 | 1/2019 | Chen | |
| 2019/0221385 | A1 | 7/2019 | Chang et al. | |
| 2020/0051760 | A1 | 2/2020 | Lin | |

FOREIGN PATENT DOCUMENTS

| | | | |
|---|---|---|---|
| CN | 105826115 | A | 8/2016 |
| CN | 207558674 | U | 6/2018 |

* cited by examiner

KEY MODULE

This is a Continuation of U.S. application Ser. No. 16/931,805, filed Jul. 17, 2020, which claims the benefit of U.S. provisional application Ser. No. 62/875,007, filed Jul. 17, 2019, the subject matters of which are incorporated herein by reference.

FIELD OF THE INVENTION

The invention relates to a key module.

BACKGROUND OF THE INVENTION

Keyboards have become indispensable input devices for computers. Especially, in order to make a lighter or more compact portable computer without compromise on its lifetime, keyboard manufacturers need to develop a thin and stable key module. It is known that key module would generate noise during operation due to factors, such as assembly clearances, vibrations and strokes, which could cause disturbance to users and the surroundings. Thus, how to mitigate the noise generated by the operation of the key module is an upward trend.

SUMMARY OF THE INVENTION

The present invention is to provide a key module capable of reducing the noise during the operation of the key module.

In an embodiment of the invention, a key module is provided. The key module includes a base plate, a circuit layer, a lifting mechanism, a keycap and a link bar. The circuit layer is disposed on the base plate, wherein the circuit layer has a hole recessed with respect to a surface of the circuit layer. The lifting mechanism is pivotally connected with the base plate and adapted to move up and down relative to the circuit layer. The keycap is disposed on the lifting mechanism and includes a skirt portion and a connecting portion surrounded by the skirt portion, wherein the skirt portion and the connecting portion respectively have a first bottom surface and a second bottom surface facing the circuit layer, the second bottom surface is closer to the circuit layer than the first bottom surface, a portion of connecting portion is projected on a physical portion of the circuit layer along a pressing direction, and the second bottom surface of the connecting portion is located within the hole when the keycap is in a pressed state. The link bar is pivotally connected with the connecting portion.

In another embodiment of the invention, a key module is provided. The key module includes a base plate; a circuit layer disposed on the base plate; a keycap disposed on the circuit layer; and lifting mechanism movably connected to the base plate and the keycap respectively. Wherein an abutment element is positioned between the lifting mechanism and the circuit layer, and in physical contact with the lifting mechanism and the circuit layer respectively.

Numerous objects, features and advantages of the invention will be readily apparent upon a reading of the following detailed description of embodiments of the invention when taken in conjunction with the accompanying drawings. However, the drawings employed herein are for the purpose of descriptions and should not be regarded as limiting.

BRIEF DESCRIPTION OF THE DRAWINGS

The above objects and advantages of the invention will become more readily apparent to those ordinarily skilled in the art after reviewing the following detailed description and accompanying drawings, in which.

DETAILED DESCRIPTION OF PREFERRED EMBODIMENTS

Figure 1:
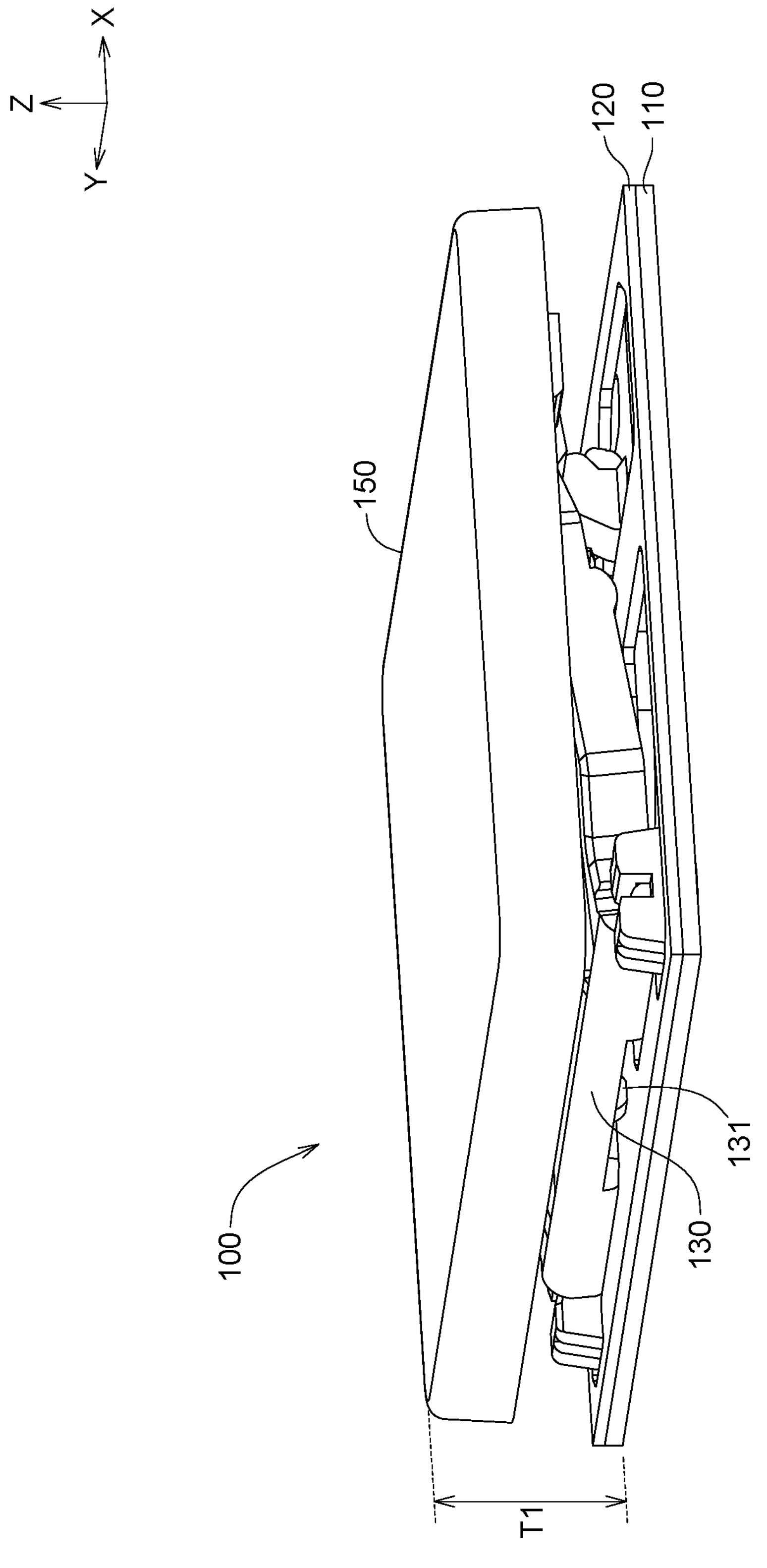
FIG. 1 is a schematic diagram of a key module according to an embodiment of the present invention.
Figure 2:
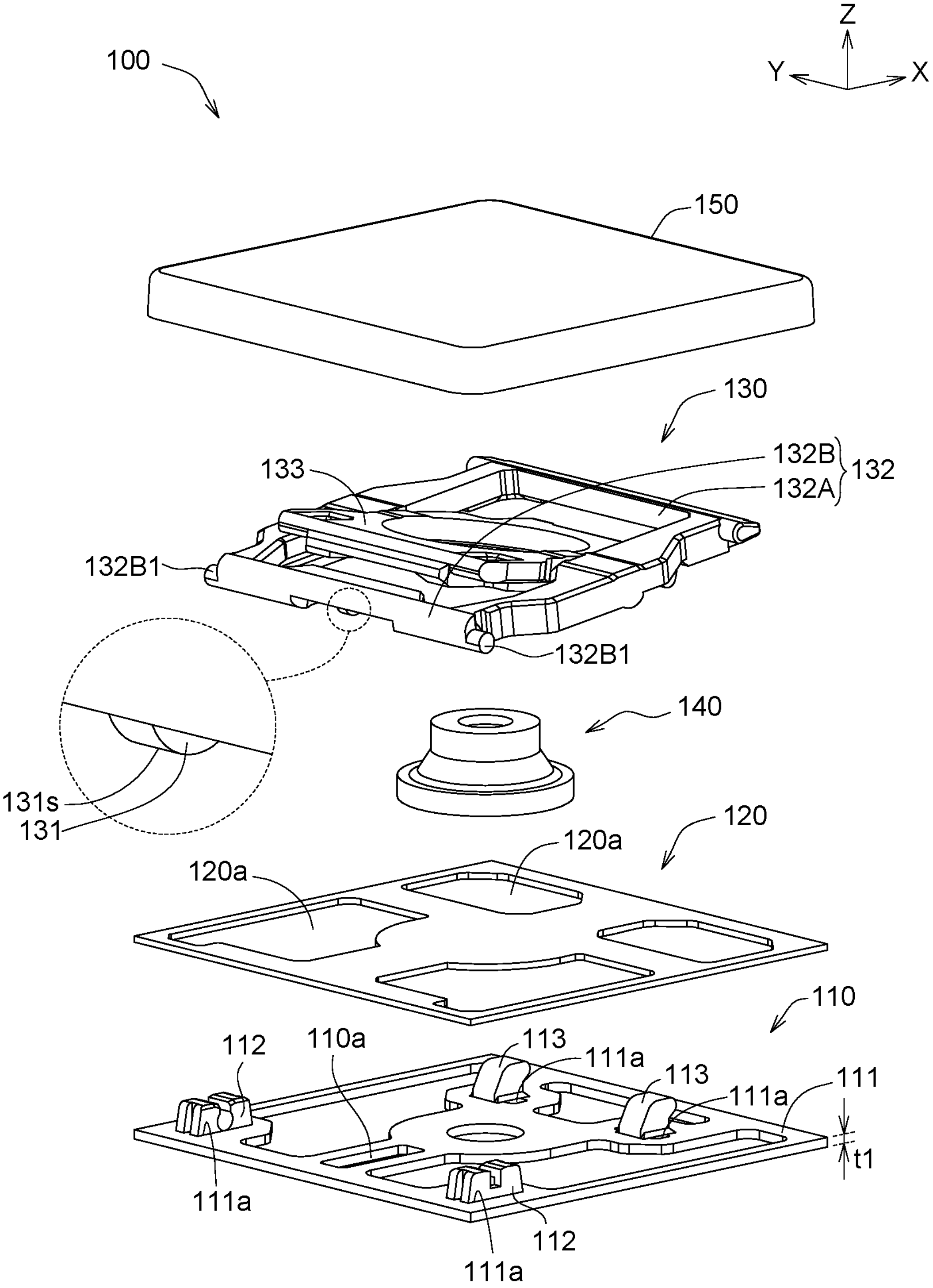
FIG. 2 is an exploded view of the key module of FIG. 1.
Figure 3:
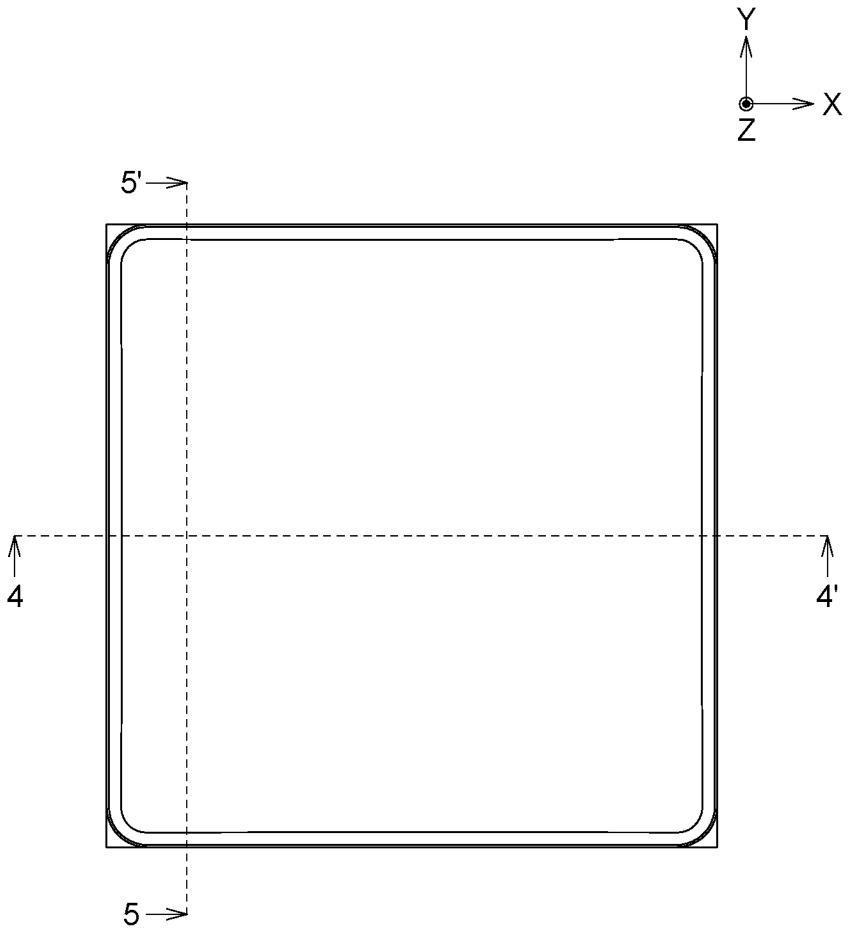
FIG. 3 is a top view of the key module of FIG. 1.
Figure 4:
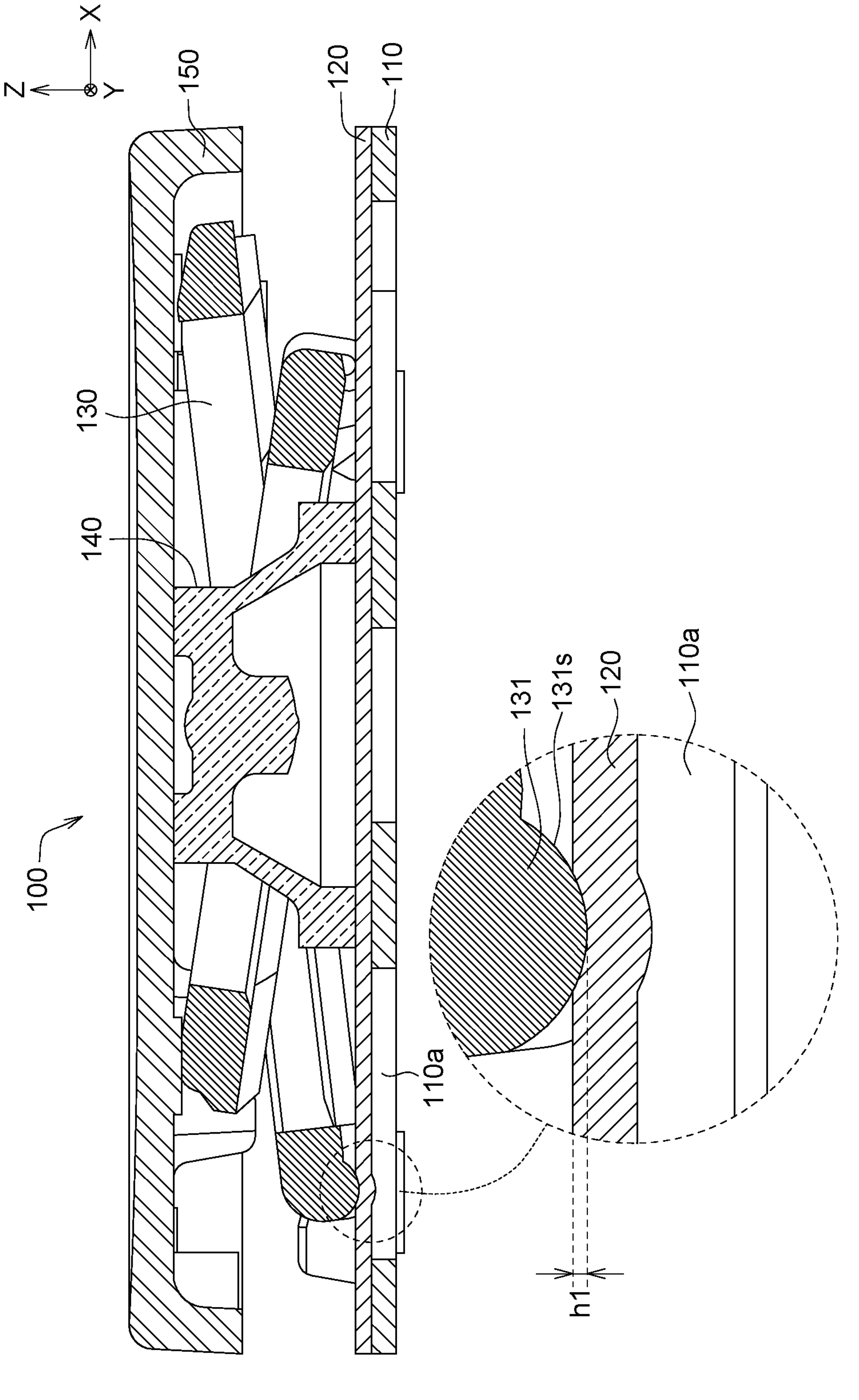
FIG. 4 is a cross-sectional view of the key module (in a released state) of FIG. 3 along the direction 4-4'.
Figure 5:
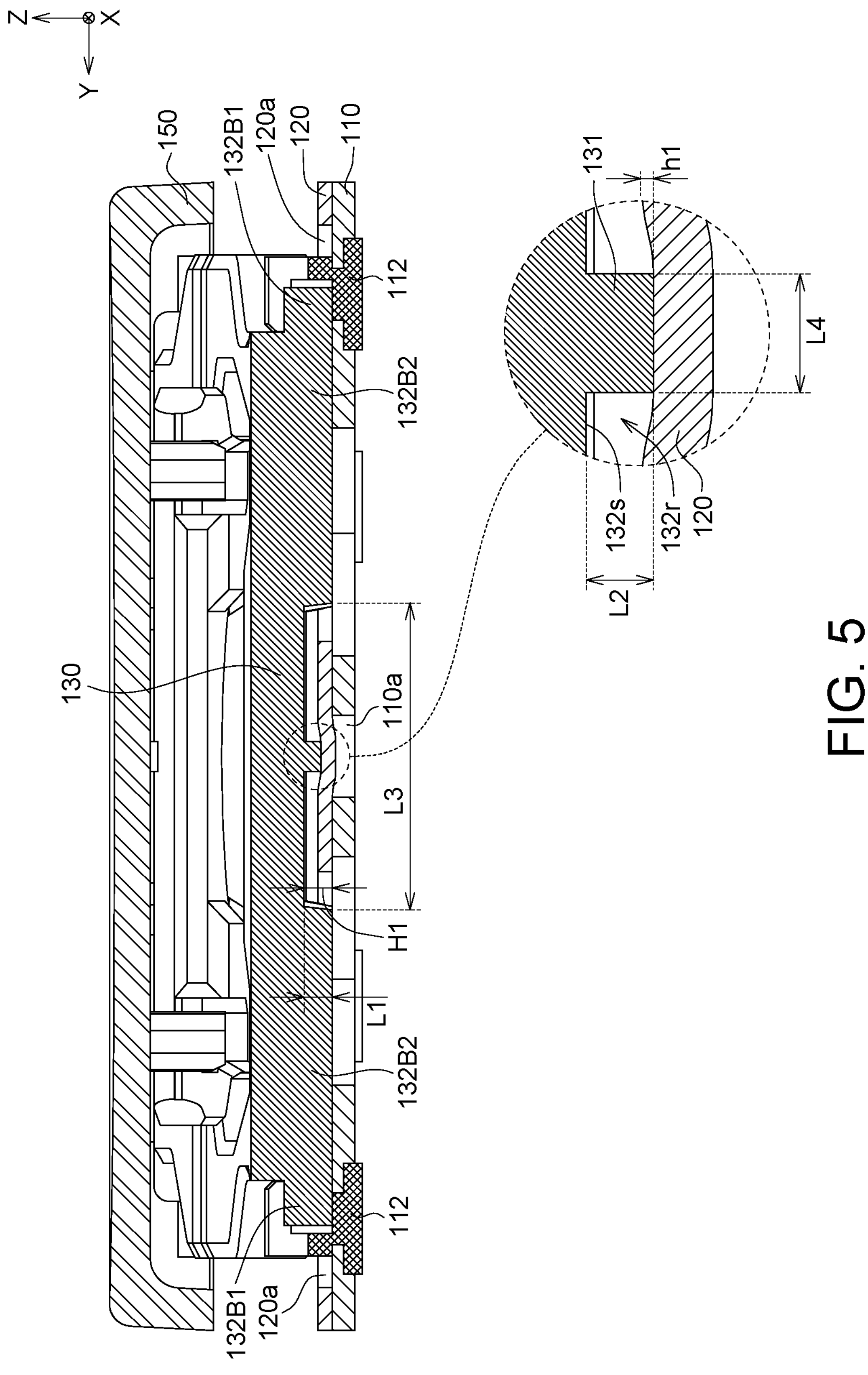
FIG. 5 is a cross-sectional view of the key module of FIG. 3 along the direction 5-5'.
Figure 6:
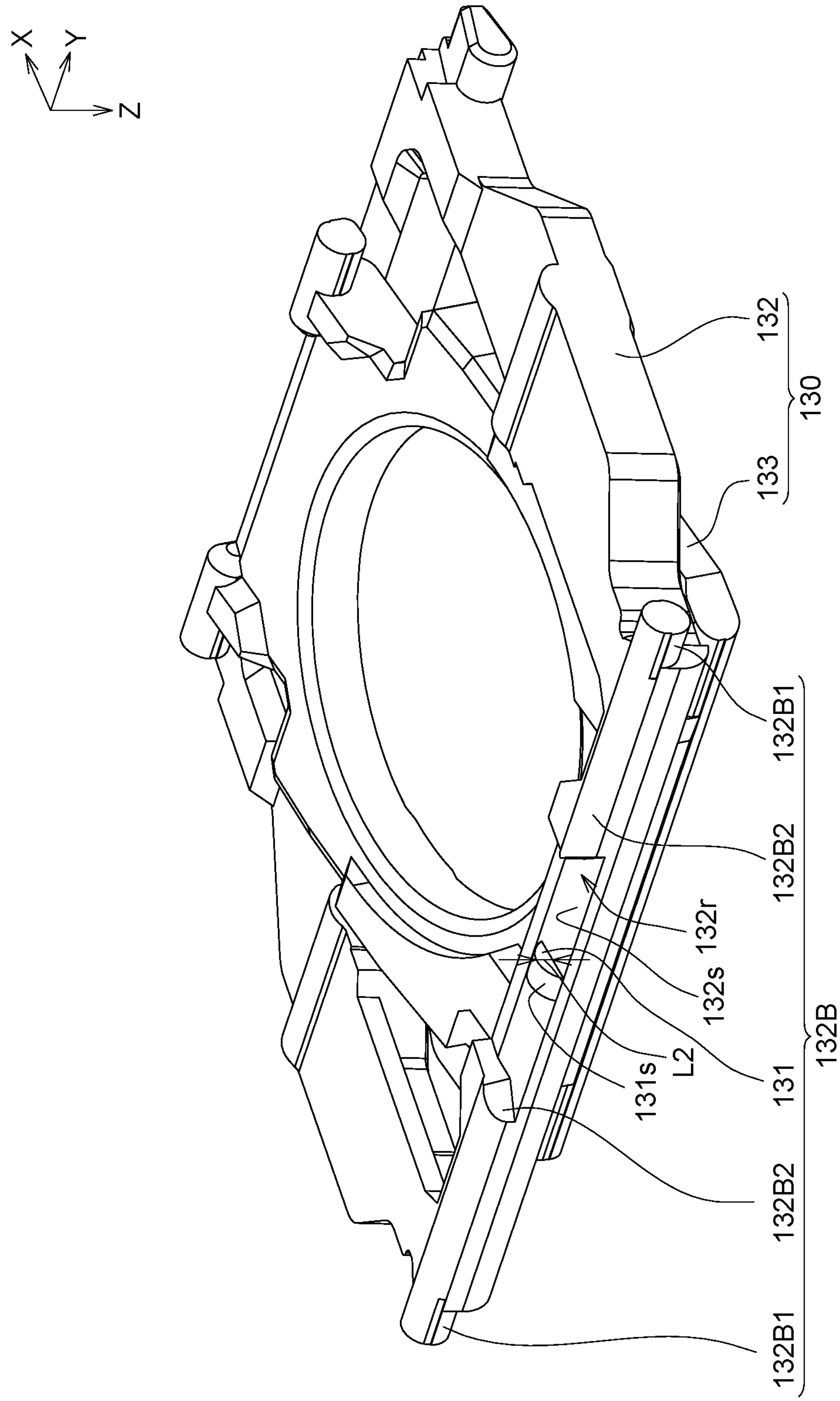
FIG. 6 is schematic diagram of the lifting mechanism of FIG. 2.
Figure 7:
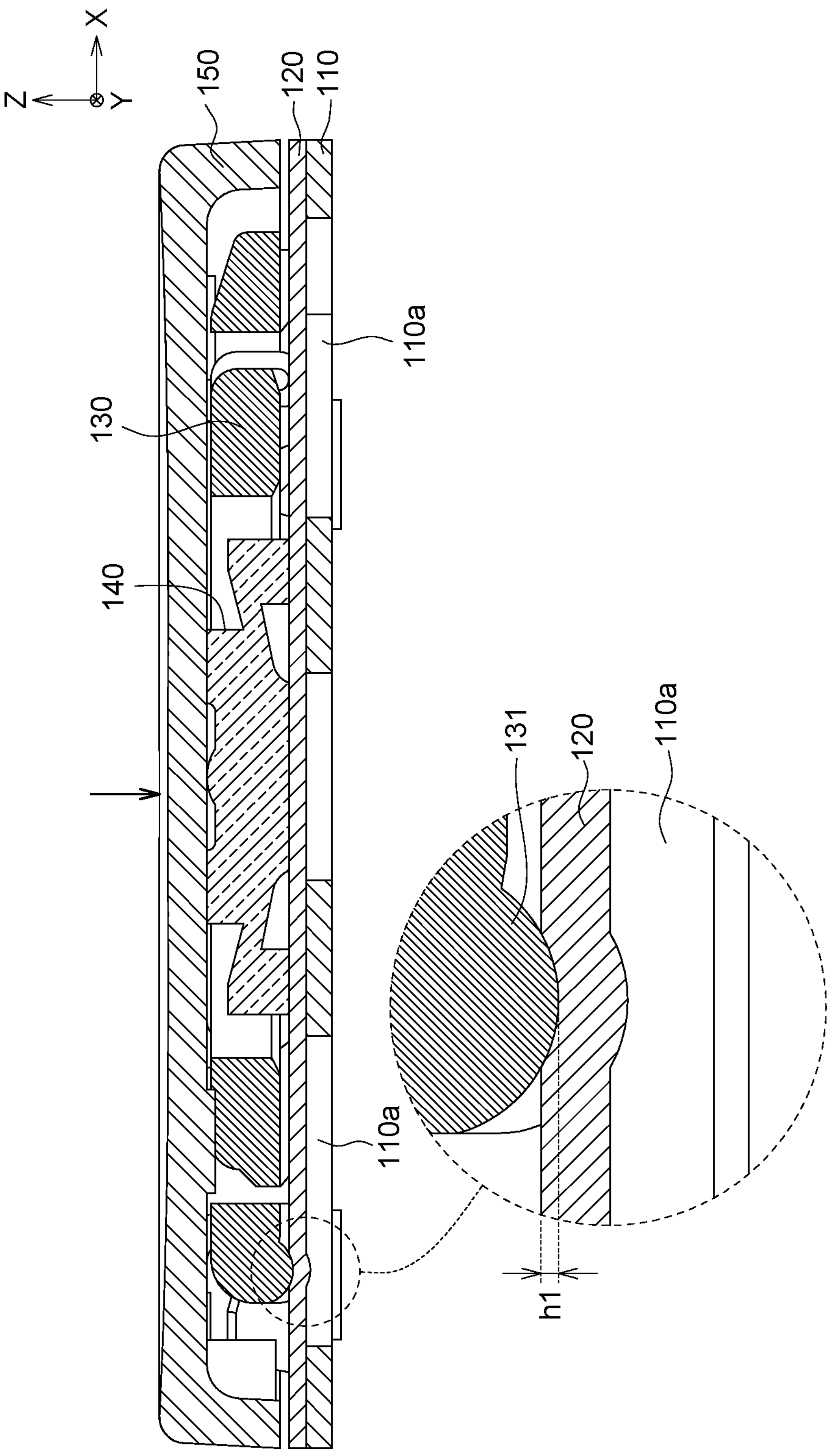
FIG. 7 is a cross-sectional view of the key module of FIG. 4 changed to a pressed state

Referring to FIGS. 1 to 7. FIG. 1 is a schematic diagram of a key module 100 according to an embodiment of the present invention. FIG. 2 is an exploded view of the key module 100 of FIG. 1, FIG. 3 is a top view of the key module 100 of FIG. 1, FIG. 4 is a cross-sectional view of the key module 100 (in a released state) of FIG. 3 along the direction 4-4', FIG. 5 is a cross-sectional view of the key module 100 of FIG. 3 along the direction 5-5', and FIG. 6 is schematic diagram of the lifting mechanism 130 of FIG. 2, and FIG. 7 is a cross-sectional view of the key module 100 of FIG. 4 changed to a pressed state.

The key module 100 could be applied to an electronic device, such as keyboards, home appliances or other various devices that require input of commands/signals. The keyboard could be a peripheral device selectively connected with a desktop computer or home appliance, or incorporated into a laptop computer.

As shown in FIGS. 1 and 2, the key module 100 includes a base plate 110, a circuit layer 120, a lifting mechanism 130, an elastic body 140 and a keycap 150.

As shown in FIG. 2, the circuit layer 120 is disposed on the base plate 110. The lifting mechanism 130 is pivotally connected with the base plate 110 and adapted to move up and down relative to the circuit layer 120 in the lifting direction +/−Z. The lifting mechanism 130 has at least one abutment element 131. In the present embodiment, the abutment element 131 is in contact with, or even interferes with the circuit layer 120, and thus it could absorb the vibration (or impact) energy resulted from the lifting process of the lifting mechanism 130, thereby reducing the noise during the lifting process. The vibration may be caused by the assembly clearance between the base plate 110 and the lifting mechanism 130 or by an external high-frequency vibration. In addition, due to the abutment element 131 in physical contact with the circuit layer 120, it could effectively reduce the noise generated by the key module 100 subjected to a high-frequency vibration, e.g., between 300 KHz and 2000 KHz, such that the resultant noise could be less than 20 dBA or even lower than 15 dBA, to provide a better user experience. The aforementioned high-frequency vibration is generated, for example, by speakers disposed under or around the keyboard or by an oscillating part in a resonance test.

As shown in FIG. 2, the base plate 110 includes a plate body 111, at least one pivot portion 112 and at least one pivot portion 113. The plate body 111 is, for example, a metal plate body, such as an iron-based plate, a copper plate, an aluminum plate, a stainless steel plate, a galvanized steel plate, an aluminum-magnesium (Al—Mg) alloy plate, etc.; the plate body 111 could be a non-metallic plate, such as a plastic plate, carbon fiber plate or glass fiber board. The plate body 111 is thin in thickness and thus has low weight. As a result, the key module 100 could be lighter and thinner, that is, the overall thickness T1 of the key module 100 could be reduced as shown in FIG. 1. In an embodiment, the plate body board 111 has a thickness t1, and the thickness t1 is, for example, between 0.1 millimeters (mm) and 0.5 mm that could provide the plate body 111 with light weight and sufficient strength. The base plate 110 has a hollow portion **110*a* formed on the plate body 111, wherein the hollow portion 110*a* could reduce the overall weight of the base plate 110, or light emitted from a backlight module (not shown) below the base plate 110 could reach the keycap 150 through the hollow portion 110*a* for enhancing the visual effect. In another embodiment, the hollow portion 110*a* is not required for the base plate 110**.

As shown in FIG. 2, the pivot portion 112 and the pivot portion 113 are connected with the plate body 111. In an embodiment, the pivot portion 112, the pivot portion 113 and the plate body 111 of the base plate 110 are, for example, an integrally formed structure (or formed in a single piece). In a manufacturing process of the base plate 110, the pivot portion 112 and the pivot portion 113 are formed into the plate body 111 through injection molding. Furthermore, when the plate body 111 is too thin to form the pivot portion 112 and the pivot portion 113 by punching and/or bending, the pivot portion 112 and the pivot portion 113 could still be formed on and attached to the plate body 111 which could be implemented by injection-molded materials, wherein the pivot portion 112 and the pivot portion 113 are made of a material different from the plate body 111. In another manufacturing process of the base plate 110, when the plate body 111 is thicker, the pivot portion 112 and the pivot portion 113 could be formed on the plate body 111 by punching and/or bending the plate material of the plate body 111.

In terms of the injection molding process, the pivot portion 112, the pivot portion 113 and the plate body 111 could be joined together by using, for example, an insert injection molding technique. The plate body 111 could be set in the cavity of a mold (not shown), and then injection molding technology could be used to provide a fluid material (for example, high-temperature molten material) in the cavity to combine with the plate body 111, thereby forming the pivot portion 112 and the pivot portion 113 after the molten material is cured/solidified. In terms of the material, the pivot portion 112 and the pivot portion 113 are made of an insulating material, such as plastic, resin or rubber material. In terms of material properties, the melting points of the pivot portion 112 and the pivot portion 113 could be lower than the melting point of a substance of the plate body 111, so that the plate body 111 could maintain the solid state during the insert injection molding process (without affecting the function of the plate body 111). The fluid pivot portion material could flow into an embedding hole **111*a* of the plate body 111 and the cavity to form the pivot portion 112 and the pivot portion 113** after being cured.

As shown in FIGS. 2 and 5, the circuit layer 120 is disposed on the base plate 110. The circuit layer 120 has at least one hollow portion **120*a*. The pivot portion 112 and the pivot portion 113 are pivotally connected to the lifting mechanism 130 by passing through the hollow portion 120*a*. In addition, the circuit layer 120 could have a multi-layer structure similar to or the same as that of the circuit layer 220** described later, and the similarities will not be repeated here.

The lifting mechanism 130 is pivotally connected with the pivot portion 112 and the pivot portion 113. In the present embodiment, the lifting mechanism 130 is, for example but not limited to, a scissor-like mechanism. The lifting mechanism 130 could be other types of lifting mechanisms, such as a wing-shaped bracket or a bracket driven by magnetic force. Taking the scissor mechanism as an example, as shown in FIGS. 2 and 5, the lifting mechanism 130 includes an outer bracket 132 and an inner bracket 133 pivotally connected with the outer bracket 132, so that the outer bracket 132 and the inner bracket 133 could rotate relatively. The outer bracket 132 includes a rod 132A and a pivot rod 1328. A protuberance 13281 of the pivot rod 132B is pivotally connected with the pivot portion 112, and one end of the inner bracket 133 could be pivotally connected with the pivot portion 113, so that the lifting mechanism 130 could move up and down relative to the pivot portion 112 and the pivot portion 113. As shown in FIGS. 2 and 6, the abutment element 131 is located on the outer bracket 132. For example, the abutment element 131 is located on the pivot rod 1328 of the outer bracket 132.

As shown in FIGS. 4 and 5, the position of the abutment element 131 corresponds to the hollow portion **110*a* of the base plate 110 in the pressing direction −Z (shown in FIG. 1). For example, the projection area of the abutment element 131 projected on the circuit layer 120 in the pressing direction −Z at least partially overlaps the hollow portion 110*a*. In an embodiment, the projection area of the abutment element 131 projected on the circuit layer 120 in the pressing direction −Z could be completely fall within the range of the hollow portion 110*a* (as shown in FIG. 2), so that it could further reduce the stress of the base plate 110 applied by the abutment element 131. As a result, the base plate 110 has the hollow portion 110*a* right below the abutment element 131, so the stress of the base plate 110 applied by the abutment element 131 could be reduced. In addition, since the abutment element 131 is positioned corresponding to the hollow portion 110*a*, a portion of the circuit layer 120 corresponding to the hollow portion 110*a* could slightly protrude toward the hollow portion 110*a*, thereby reducing the interference amount between the abutment element 131 and the circuit layer 120, so that the interference resistance between the abutment element 131 and the circuit layer 120 is appropriate. When the key module 100 is switched between the pressed state (as shown in FIG. 7) and the released state (as shown in FIG. 4), the interference resistance between the abutment element 131 and the circuit layer 120 is small due to the position of the abutment element 131 corresponding to the hollow portion 110***a*. The "released state" herein means the state wherein the key module 100 is not subjected to pressing force, and the "pressed state" means the trigger state wherein the key module 100 is subjected to pressing force.

In this embodiment, as shown in FIGS. 4 and 7, the abutment element 131 is in constant contact with the circuit layer 120. For example, no matter whether the key module 100 is in the pressed state (as shown in FIG. 7) or the released state (as shown in FIG. 4), the abutment element 131 is in contact with the circuit layer 120. In other words, during the lifting process of the lifting mechanism 130, the abutment element 131 and the circuit layer 120 maintain in a considerable degree of interference.

In terms of geometric characteristics, as shown in FIGS. 4 and 6, the abutment element 131 could have a curved surface 131*s* at the interface between the abutment element 131 and the circuit layer 120, and the abutment element 131 interferes with the circuit layer 120 by the curved surface 131*s*. As a result, during the pressing process of the key module 100, the interference amount h1 between the abutment element 131 and the circuit layer 120 could be maintained approximately (or substantially) the same. In the embodiment, the curved surface 131*s* is, for example, a part of a cylindrical surface, such as a semi-cylindrical surface, or a part of a spherical surface, such as a semi-spherical surface. However, the embodiment of the present invention is not limited thereto. In other embodiments, the curved surface 131*s* could be arbitrary curved surface of other geometric shapes, or a composite surface composed of a flat surface and a curved surface.

As shown in FIGS. 5 and 6, the outer bracket 132 of the lifting mechanism 130 further includes a niche 132*r* recessed with respect to a rod body 132B2 of the outer bracket 132. The niche 132*r* and the rod body 132B2 are disposed on the pivot rod 132B, and the protuberance 132B1 is located at two opposite sides of the rod body 132B2. In the present embodiment, the niche 132*r* is located below the center of the rod body 132B2, and the abutment element 131 is located within the niche 132*r*. The lifting mechanism 130 further includes a surface facing the circuit layer 120, and the rod body 13262 and the abutment element 131 protrude with respect to the surface. For example, the niche 132*r* of the lifting mechanism 130 has a sunken bottom surface 132*s* facing the circuit layer 120, wherein the rod body 132B2 and the abutment element 131 protrude from the sunken bottom surface 132*s*.

As shown in FIGS. 2 and 5, the niche 132*r* allows the circuit layer 120 to pass through underneath the niche 132*r*, and it could avoid excessive interference between the lifting mechanism 130 and the circuit layer 120 (except for the abutment element 131). As a result, the interference resistance between the mechanism 130 and the circuit layer 120 could be reduced, and therefore, the tactile feedbacks are not compromised.

As shown in FIG. 5, the rod body 132B2 is correspondingly disposed in the hollow portion 120*a* of the circuit layer 120, so as to avoid excessive interference between the lifting mechanism 130 and the circuit layer 120, thereby reducing the interference resistance between the lifting mechanism 130 and the circuit layer 120. In the present embodiment, as shown in FIG. 5, protrusion height L1 of the rod body 132B2 with respect to the sunken bottom surface 132*s* is greater than protrusion height L2 of the abutment element 131 with respect to the sunken bottom surface 132*s*. The protrusion height L1 of the rod body 132B2 could increase structural strength of the pivot rod 1328 on both outer sides of the niche 132*r* to improve the overall strength of the lifting mechanism 130.

As shown in FIG. 5, the niche 132*r* has a recess height H1, and the recess height H1 is, for example, the distance between the sunken bottom surface 132*s* and the outer surface of the rod body 132B2. Through the dimensional design/collocation of the recess height H1 and the protrusion height L2 of the abutment element 131, an appropriate interference amount h1 between the abutment element 131 and the circuit layer 120 could be obtained (the height by which the abutment element 131 presses down the circuit layer 120), so as to obtain the appropriate interference resistance between the abutment element 131 and the circuit layer 120 and effectively reduce the noise. In an embodiment, the interference amount h1 could range between 0.01 millimeter (mm) and 0.1 mm. Through the appropriate interference amount h1, it could obtain the benefits of "not negatively affecting (not compromising) the force-distance curve of the key module 100 (i.e., characteristic curve of pressing force and travel distance, also called FD curve)" and "noise reduction". In an embodiment, the interference amount h1 is preset to be between 0.04 mm and 0.06 mm. That is, the abutment element 131 presses the circuit layer 120 downward about 0.04 mm to about 0.06 mm, and the assembly clearance resulted from tolerances of the elements could be effectively reduced without sacrificing the tactile feedbacks.

In addition, as shown in FIGS. 5 and 6, the abutment 131 is located approximately in the middle position of the lifting mechanism 130. For example, the abutment element 131 is located in the middle position of the pivot rod 132B of the lifting mechanism 130. The niche 132*r* has a length L3 in the extension direction +/−Y of the pivot rod 1328, and the abutment element 131 has a length L4 in the extension direction +/−Y, wherein the length L4 is smaller than the length L3.

The greater the length L3 of the niche 132*r* is, the lower the strength of the lifting mechanism 130 is, and the smaller the length L3, the greater the probability of interference between the lifting mechanism 130 and the circuit layer 120 is. In addition, the greater the length L4 of the abutment element 131 is, the greater the interference resistance between the lifting mechanism 130 and the circuit layer 120 is, and it could negatively affect (or excessively change) the force-distance curve of the key module 100. The smaller the length L4 is, the less the effect of the noise reduction is. In addition, the lifting mechanism 130 could further have a plurality of abutment elements 131, for example, the plurality of abutment elements 131 are symmetrically disposed or evenly distributed within the niche 132*r*. In an embodiment, the ratio of the length L4 of a single abutment element 131 to the length L3 (L4/L3) or the ratio of the sum of the lengths L4 of multiple abutment elements 131 to the length L3 could range between 1/15 and 1/3 to provide the lifting mechanism 130 with sufficient strength and avoid an excess interference between the lifting mechanism 130 and the circuit layer 120. As a result, it could have the benefits of "not negatively affecting the force-distance curve of the key module 100" and "noise reduction".

As shown in FIGS. 2, 4 and 7, the elastic body 140 is located between the keycap 150 and the circuit layer 120. When the key module 100 is switched to the pressed state (shown in FIG. 7) from the released state (shown in FIG. 4), the elastic body 140 deforms to store elastic potential energy. When the pressed key module 100 is released, the elastic body 140 releases the elastic potential energy to drive the key module 100 to return to the released state. When the key module 100 is in the pressed state, the elastic body 140 triggers a circuit switch (not shown) of the circuit layer 120, and a processor (not shown) electrically connected with the key module 100 could perform a corresponding function. The elastic body 140 is, for example, made of rubber or metal.

Figure 8A:
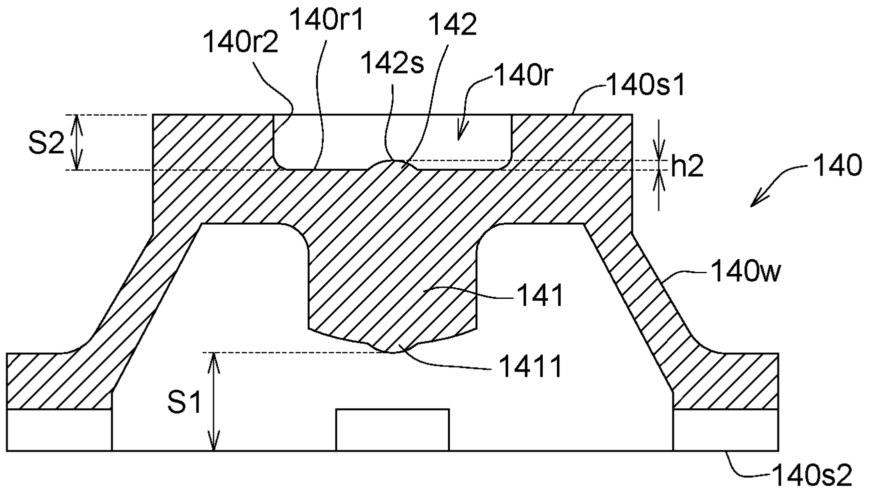
FIG. 8A is a cross-sectional view of the elastic body of FIG. 4.

Referring to FIG. 8A, FIG. 8A is a cross-sectional view of the elastic body 140 of FIG. 4. The elastic body 140 includes a top surface **140*s*1, a bottom surface 140*s*2 opposite to the top surface 140*s*1, a side wall 140*w* connecting the top surface 140*s*1 and the bottom surface 140*s*2, a conductive pillar 141, and a groove 140*r*. The top surface 140*s*1 is a surface of the elastic body 140 closer to the keycap 150 (the keycap 150 is shown in FIG. 4), and the bottom surface 140*s*2 is a surface of the elastic body 140 closer to the circuit layer 120 (the circuit layer 120 is shown in FIG. 4). The conductive pillar 141 is disposed within an internal space defined by the top surface 140*s*1, the side wall 140*w* and the bottom surface 140*s*2. In an embodiment, the conductive pillar 141 could have an abutment element 1411 located at the bottom of the conductive pillar 141 facing the circuit layer 120 to interfere with the circuit layer 120 when the key module 100 is pressed. The groove 140*r* is located on the top surface 140*s*1 and positioned above the conductive pillar 141. The groove 140*r* has, for example, a groove bottom surface 140*r*1 and a groove lateral surface 140*r*2 both of which define a receiving space recessed from the top surface 140*s*1. The elastic body 140 further includes an abutment structure 142. The abutment structure 142 and the abutment element 1411 are aligned in, for example, a central axis. The abutment structure 142 is, for example, a protruding portion located in the groove 140*r*, and the abutment structure 142 could integrally protrude from the groove bottom surface 140*r*1. In an embodiment, the abutment structure 142 has a surface 142*s* which is, for example, a cylindrical surface or a spherical surface, and it could provide point contact upon the keycap 150 in contact with the groove 140*r*. As shown in FIGS. 7 and 8A, when the keycap 150 is pressed to deform the elastic body 140, the protruding abutment structure 142 interferes with the keycap 150, and thus the contact area between the groove bottom surface 140*r*1 of the groove 140*r* and the keycap 150 could be reduced to prevent the groove bottom surface 140*r*1 from being adhered to the surface of the keycap 150. As a result, the noise caused by the elastic body 140 to be separated from the keycap 150 (e.g., the sound that the air is squeezed out of or sucked into the groove 140*r*) could be reduced when the keycap 150 is released. Furthermore, in order not to impact the tactile feedbacks of the elastic body 140, the height h2 of the abutment structure 142 is less than the depth of the groove 140*r* (e.g., the distance S2 between the top surface 140*s*1 and the groove bottom surface 140*r*1 in the pressing direction). In an embodiment, the height h2 of the abutment structure 142 could be less than about 10% of the overall travel distance of the elastic body 140. The aforementioned travel distance is, for example, the sum of the distance S2 and the distance S1 between the abutment element 1411 and the bottom surface 140*s*2** in the depression direction.

Figure 8B:
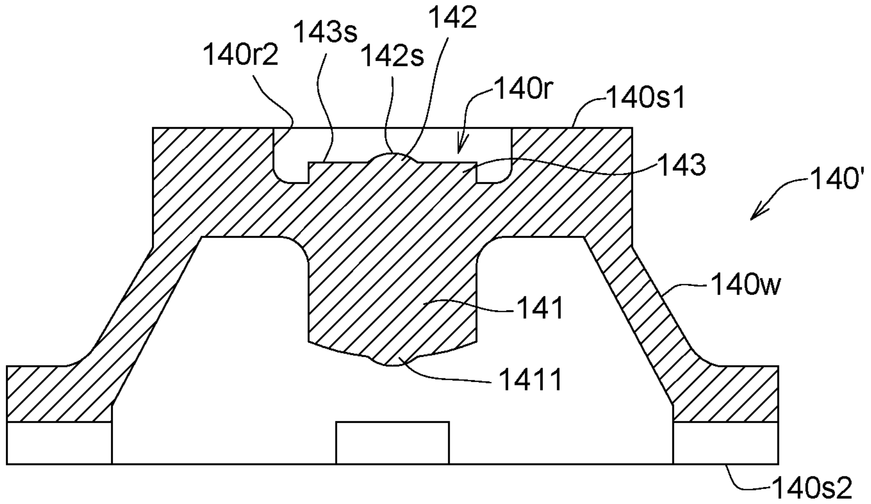
FIG. 8B is a cross-sectional view of an elastic body according to another embodiment of the present invention.

Referring to FIG. 8B, FIG. 8B is a cross-sectional view of an elastic body 140' according to another embodiment of the present invention. The structure of the elastic body 140' is different from that of the elastic body 140, where the elastic body 140' further includes a protrusion 143. The protrusion 143 is located within the groove **140*r* and protrudes from the groove bottom surface 140*r*1, and the abutment structure 142 is located on the protrusion 143 and protrudes from the top surface 143*s* of the protrusion 143. In an embodiment, as seen in the top view of FIG. 8B, the protrusion 143 could be polygonal, circular, or elliptical, where the polygon is, for example, triangular, square, or rectangular. In addition, the groove bottom surface 140*r*1 of FIGS. 8A and 8**B is, for example, a flat surface, or non-planar surface, for example, a curved surface.

As shown in FIGS. 2 and 5, the keycap 150 is pivotally connected to the lifting mechanism 130, and thus the keycap 150 could move up and down with the lifting mechanism 130.

Although the abutment element 131 of the above embodiment is described as an example provided in the lifting mechanism 130 and interfering with the circuit layer 120 (to achieve the noise reduction), the embodiments of the present invention are not limited thereto. In another embodiment, the abutment element 131 is not disposed on the lifting mechanism 130, but at least one abutment element is disposed on the surface of the circuit layer 120 facing the lifting mechanism 130, which is illustrated by FIG. 9 as an example.

Figure 9:
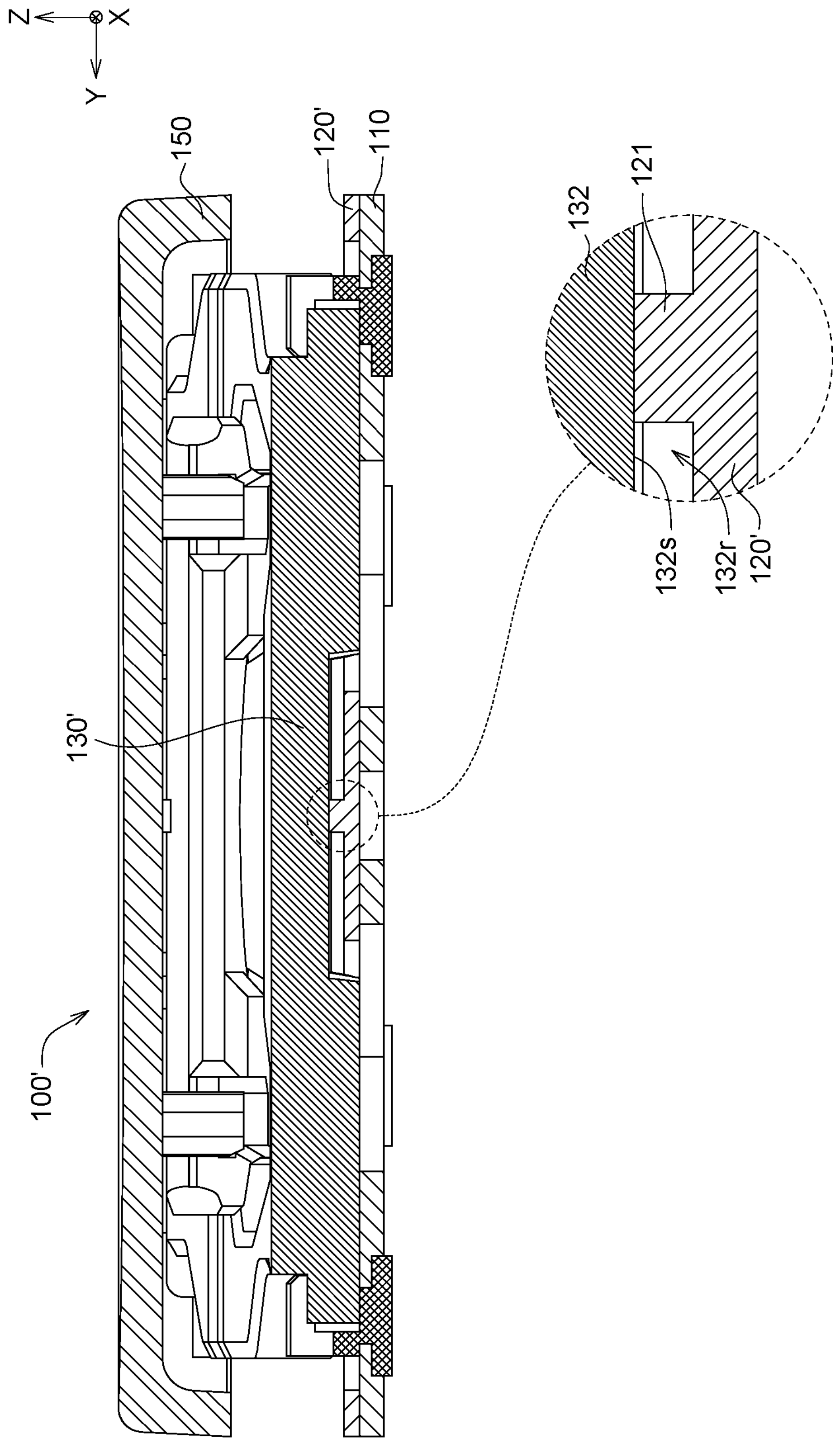
FIG. 9 is a cross-sectional view of a key module according to another embodiment of the present invention.

Referring to FIG. 9, FIG. 9 is a cross-sectional view of a key module 100' according to another embodiment of the present invention. The structure of the key module 100' is different from that of the key module 100, where the circuit layer 120' of the key module 100' further includes an abutment element 121, and the abutment element 131 could be removed from the lifting mechanism 130' of the key module 100'.

Furthermore, the abutment element 121 is, for example, disposed on the topmost membrane of the circuit layer 120' coupled to the elastic body 140, and the abutment element 121 could protrude from the membrane upper surface of the circuit layer 120' and contact the outer bracket 132 of the lifting mechanism 130'. The abutment element 121 could interfere with the outer bracket 132 in way of configuration similar to that of the abutment element 131 in the above embodiment. For example, the abutment element 121 is disposed on the circuit layer 120' corresponding to the niche **132*r* of the outer bracket 132 so that the protruding abutment element 121 could be in constant contact with, for example, the sunken bottom surface 132*s* of the niche 132*r*. The abutment element 121 could be formed as block patterns or strip patterns on the upper membrane surface of the circuit layer 120 by using insulating buffer material, such as photocuring material, thermosetting material, polymer, foam, epoxy resin, grease, etc. As a result, the abutment element 121 could provide flexible interference between the lifting mechanism 130' and the circuit layer 120', and thus, it could compensate the assembly clearance and reduce the noise resulted from the vibration without compromising the tactile feedback. In other embodiments, a plurality of (e.g., a pair of) abutment elements 121 could be disposed on the surface of the circuit layer 120', thereby providing more stable interference between the circuit layer 120' and the niche 132*r* of the outer bracket 132**.

Figure 10:
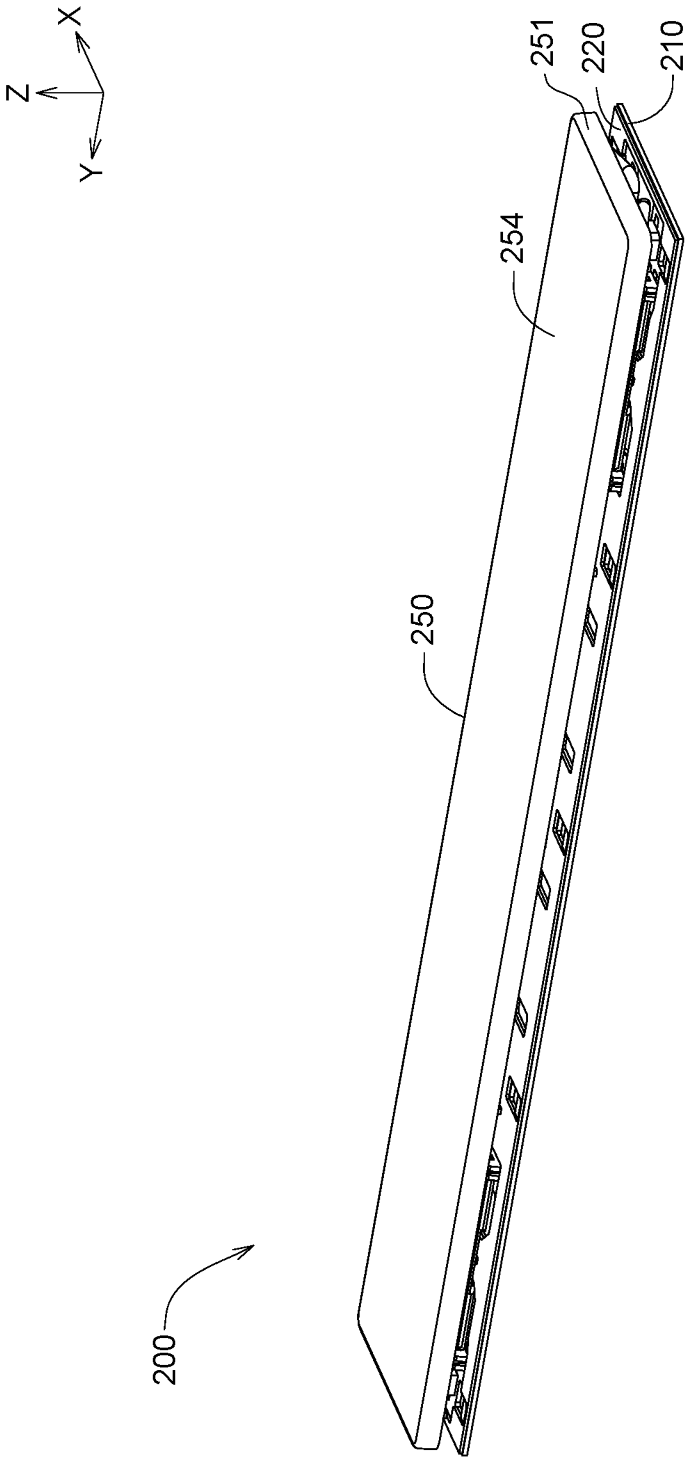
FIG. 10 is a schematic diagram of a key module according to another embodiment of the present invention.
Figure 11:
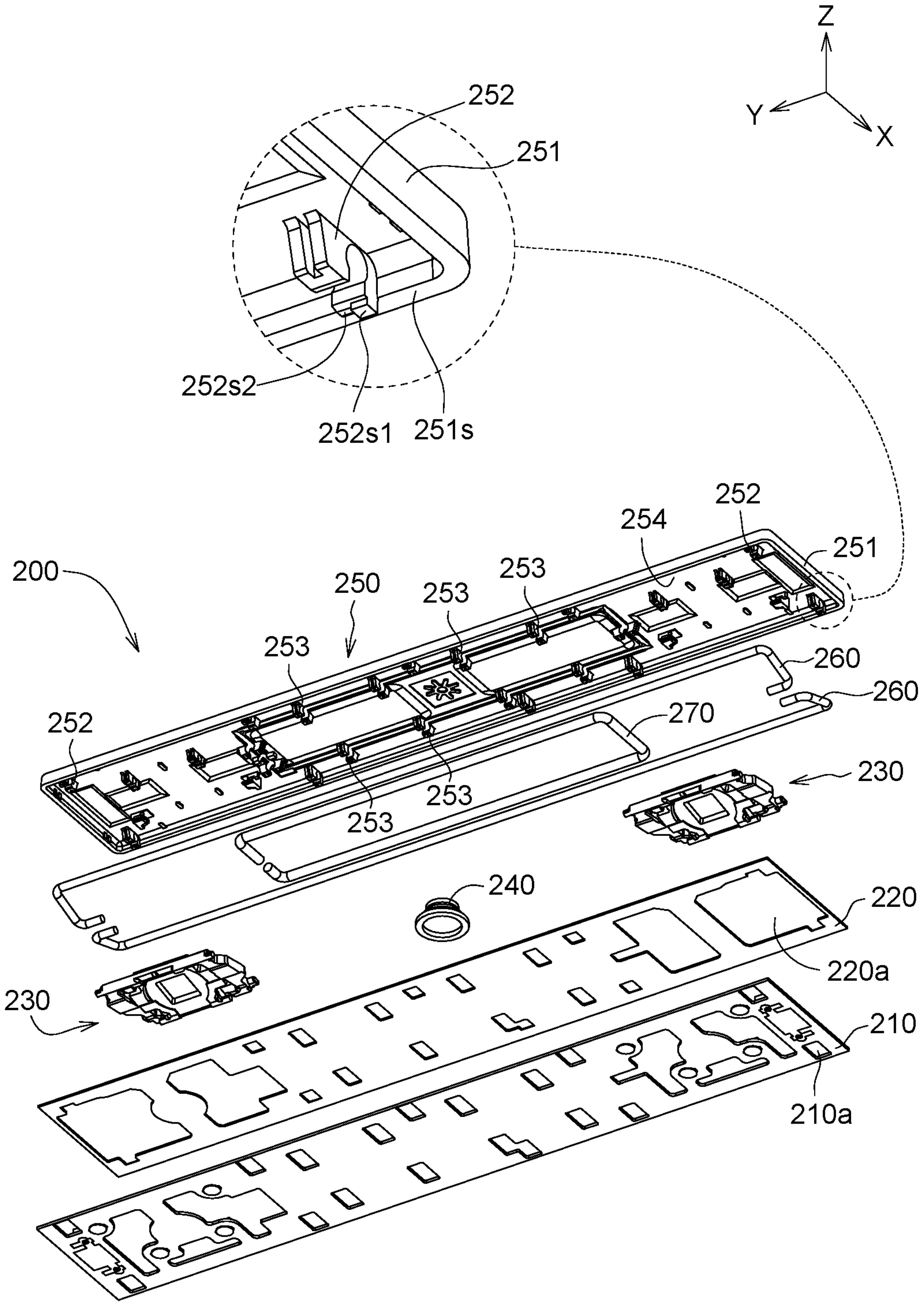
FIGS. 11 and 12 are exploded views of the key module of FIG. 10.
Figure 12:
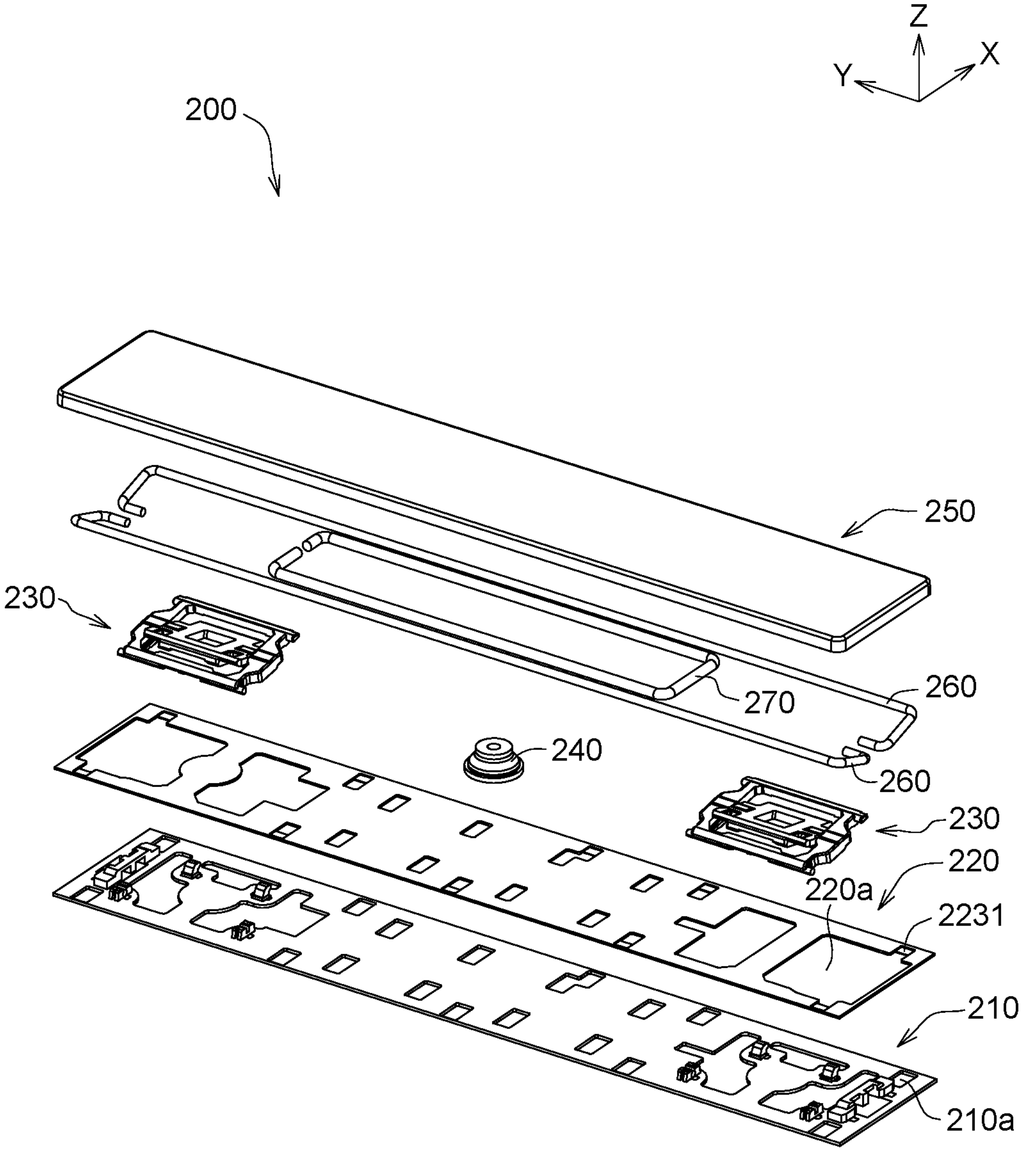
Figure 13:
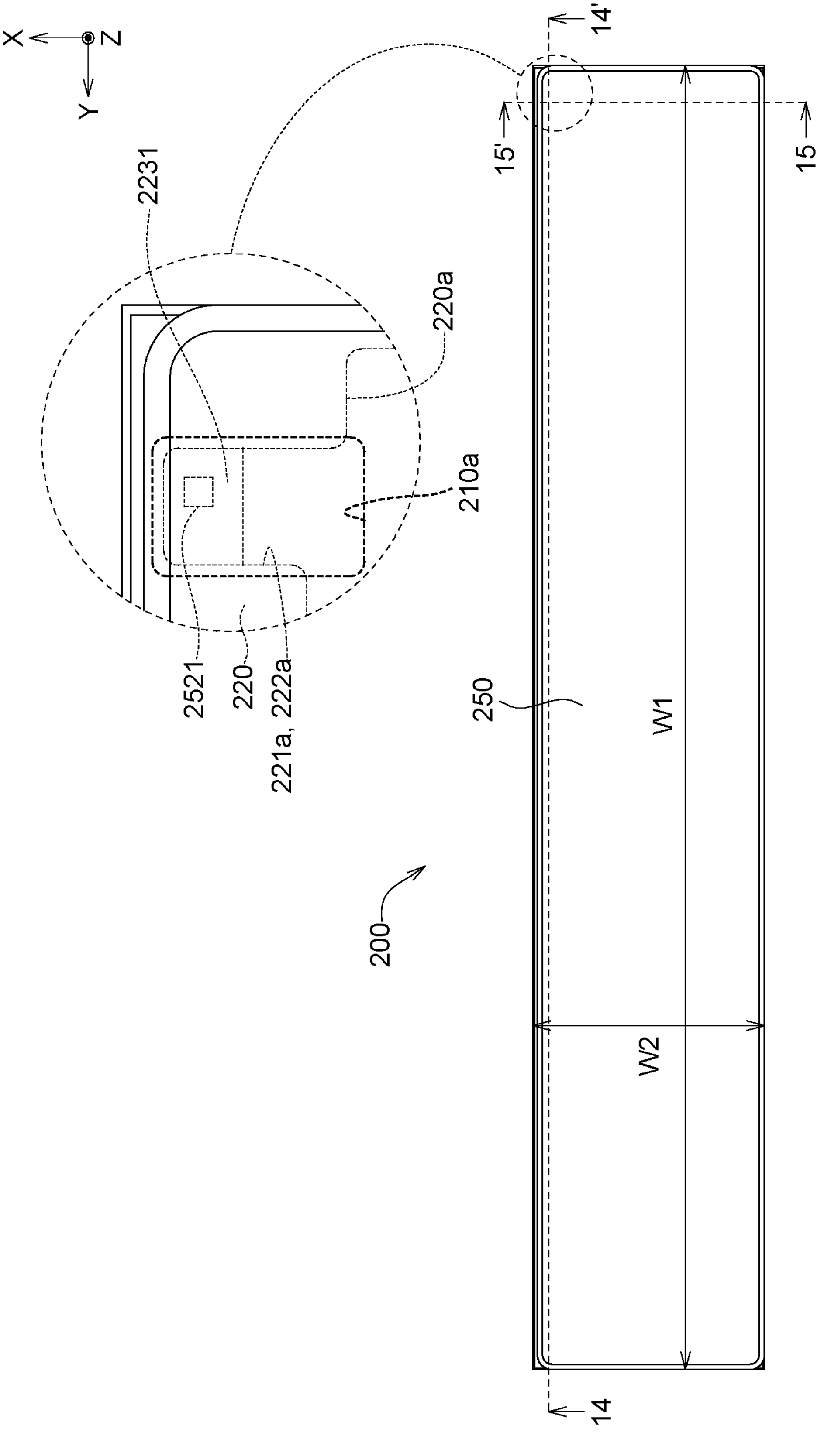
FIG. 13 is a top view of the key module of FIG. 10.
Figure 14:
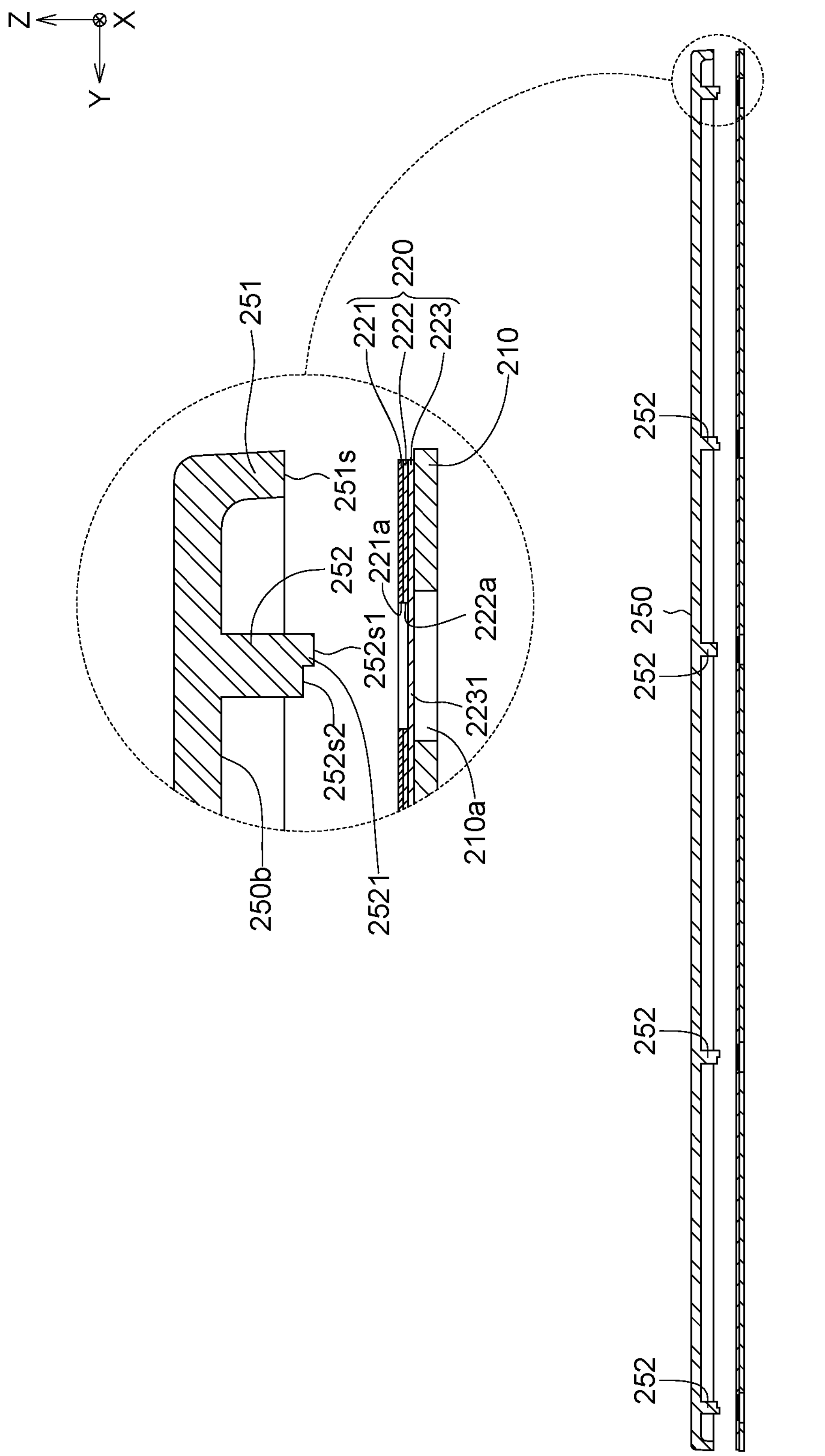
FIG. 14 is a cross-sectional view of the key module (in the released state) of FIG. 13 along the direction 14-14'.
Figure 15:
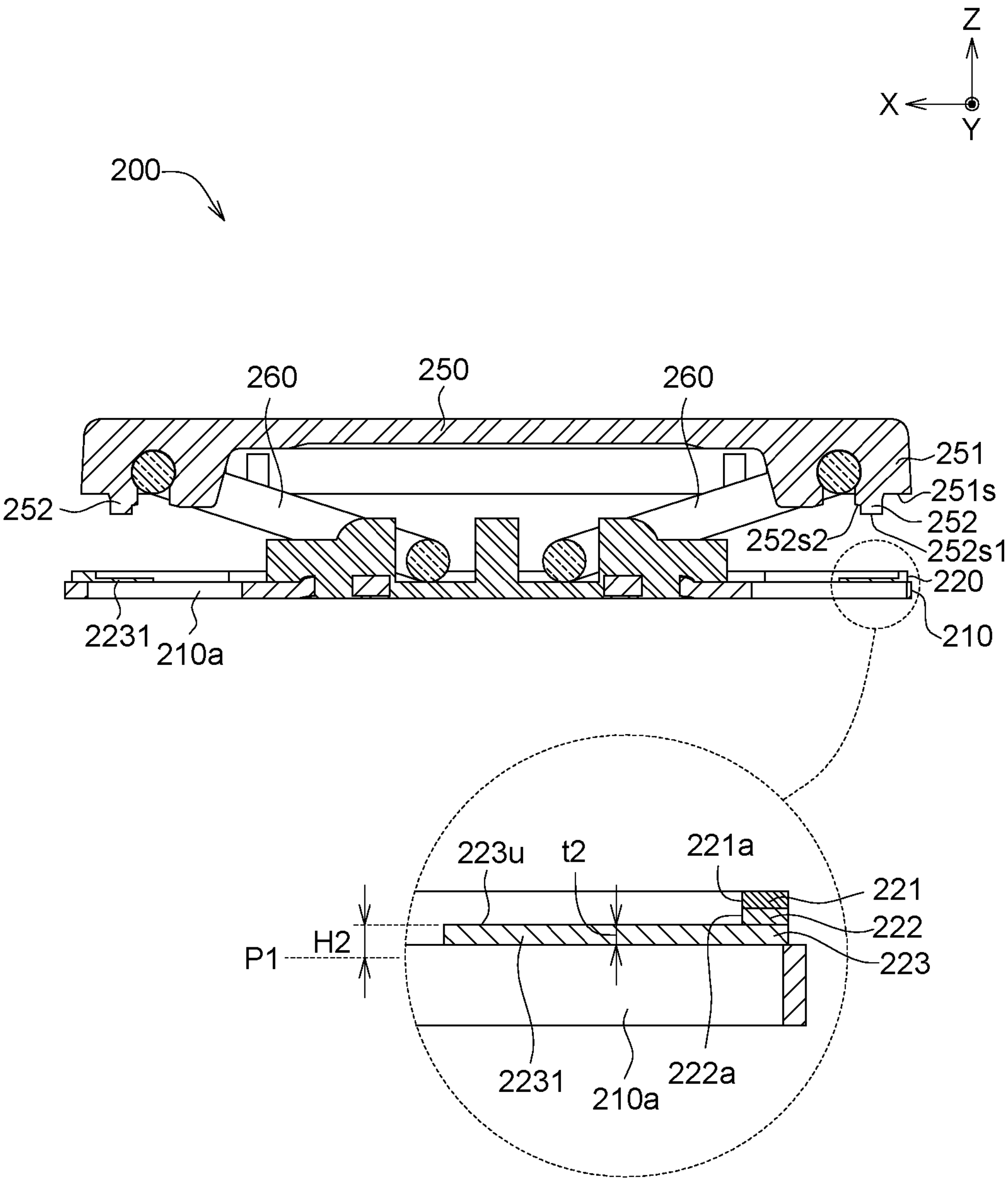
FIG. 15 is a cross-sectional view of the key module of FIG. 13 along the direction 15-15'.
Figure 16:
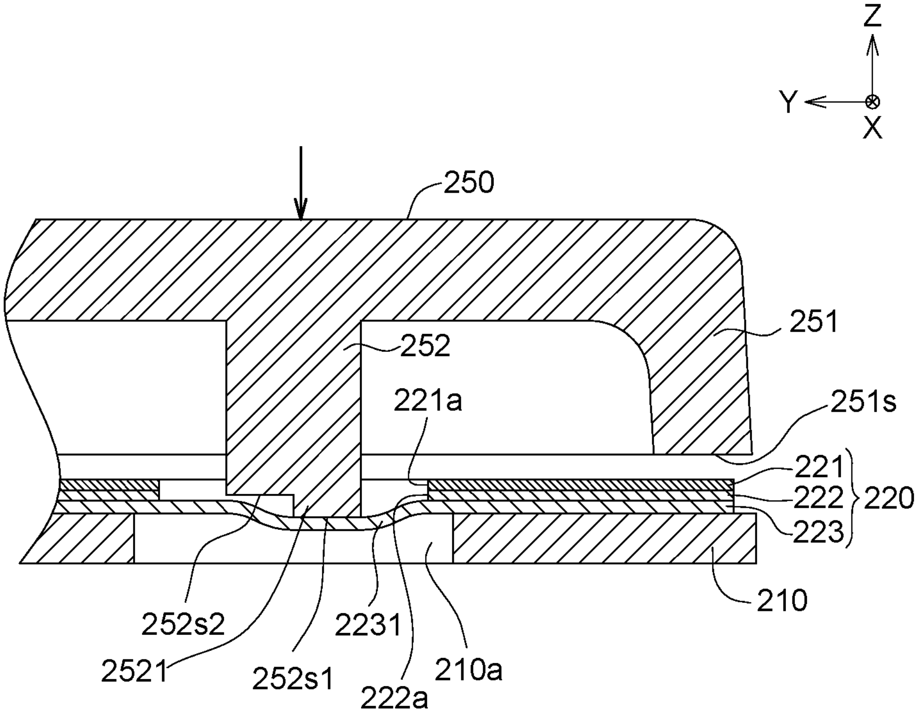
FIG. 16 is cross-sectional view of the key module of FIG. 14 changed to the pressed state.

Referring to FIGS. 10 to 16. FIG. 10 is a schematic diagram of a key module 200 according to another embodiment of the present invention, FIGS. 11 and 12 are exploded views of the key module 200 of FIG. 10, FIG. 13 is a top view of the key module 200 of FIG. 10, FIG. 14 is a cross-sectional view of the key module 200 (in the released state) of FIG. 13 along the direction 14-14', FIG. 15 is a cross-sectional view of the key module 200 of FIG. 13 along the direction 15-15', and FIG. 16 is cross-sectional view of the key module 200 of FIG. 14 changed to the pressed state.

The key module 200 includes a base plate 210, a circuit layer 220, at least one lifting mechanism 230, an elastic body 240, a keycap 250, at least one link bar 260 and at least one reinforcement member 270. The key module 200 of the present embodiment has the features similar to the key module 100 of FIG. 1, wherein the configurations, materials and/or manufacturing processes of the base plate 210, the lifting mechanism 230 and the elastic body 240 might be similar to or the same as those of the base plate 110, the lifting mechanism 130 and the elastic body 140 respectively, which are not repeated herein.

As shown in FIGS. 10, 11 and 15, the circuit layer 220 is disposed on the base plate 210. The lifting mechanism 230 is pivotally connected with the base plate 210 and adapted to move in the lifting direction +/−Z with respect to the circuit layer 220. The keycap 250 is disposed on the lifting mechanism 230 and pivotally connected with the lifting mechanism 230, such that the keycap 250 could move up and down with respect to the base plate 210 together with the lifting mechanism 230.

The keycap 250 includes a main body 254, a skirt portion 251 and at least one first connecting portion 252. The main body 254 is, for example, a thin plate structure substantially parallel to the base plate 210 and could serve as a pressing surface. The skirt portion 251 is disposed along periphery of the main body 254 and extends toward the base plate 210. The first connecting portion 252 is disposed on the bottom surface of the main body 254 facing the base plate 210 and located inside the skirt portion 251. The skirt portion 251 surrounds the first connecting portion 252. The skirt portion 251 and the first connecting portion 252 have a first bottom surface 251*s* and a second bottom surface 252*s*1 facing the circuit layer 220, respectively. The second bottom surface 252*s*1 is projected on the physical portion of the circuit layer 220 in the pressing direction −Z of the lifting mechanism 230 (e.g., an interference portion 2231 which will be described later). The second bottom surface 252*s*1 is closer to the circuit layer 220 than the first bottom surface 251*s*. That is, the distance between the second bottom surface 252*s*1 and the upper surface of the circuit layer 220 is smaller than the distance between the first bottom surface 251*s* and the upper surface of the circuit layer 220. As a result, when the key module 200 is in the pressed state (as shown in FIG. 16), the first connecting portion 252 could be in physical contact with the physical portion of the circuit layer 220.

In addition, the first connecting portion 252 and the circuit layer 220 would temporarily interfere with each other, for example. That is, the first connecting portion 252 and the circuit layer 220 do not permanently interfere with each other. Furthermore, as shown in FIG. 14, when the key module 200 is in the released state, the first connecting portion 252 and the circuit layer 220 are spaced apart from each other, that is, the second bottom surface 252*s*1 and the circuit layer 120 do not interfere with each other. As shown in FIG. 16, when the key module 200 is in the pressed state, the first connecting portion 252 and the circuit layer 220 interfere with each other. When the key module 200 is switched from the released state (shown in FIG. 14) to the pressed state (shown in FIG. 16), the keycap 250 will touch the circuit layer 220. The second bottom surface 252*s*1 of the first connecting portion 252 would touch the circuit layer 220 in advance to produce a soft landing effect. The circuit layer 220 could absorb the impact from the keycap 250, such that the noise reduction could be achieved.

The circuit layer 220 includes several membranes, wherein one of the membranes has a perforation portion, and another of the membranes includes an interference portion. For example, as shown in FIGS. 15 and 16, the circuit layer 220 includes a first circuit membrane 221, a spacer 222 and a second circuit membrane 223. The spacer 222 is located between the first circuit membrane 221 and the second circuit membrane 223, and the first circuit membrane 221 is closer to the keycap 250 than the second circuit membrane 223. The spacer 222 has a first perforation portion 222*a*. One of the first circuit membrane 221 and the second circuit membrane 223 has a second perforation portion, and the other of the first circuit membrane 221 and the second circuit membrane 223 includes an interference portion. In the present embodiment, the first circuit membrane 221 has a second perforation portion 221*a*, and the second circuit membrane 223 includes an interference portion 2231. As shown in FIGS. 13, 15 and 16, the first perforation portion 222*a*, the second perforation portion 221*a* and the interference portion 2231 substantially overlap in the pressing direction −Z.

In addition, the second bottom surface 252*s*1 is projected on the perforation portion and the interference portion in the pressing direction −Z. For example, as shown in the enlarged view of FIG. 13 and FIG. 16, the second bottom surface 252*s*1 is projected on the first perforation portion 222*a*, the second perforation portion 221*a* and the interference portion 2231 in the pressing direction −Z. When the key module 200 is in the pressed state (as shown in FIG. 16), the second bottom surface 252*s*1 of the first connecting portion 252 hits against one or more of the membranes of the circuit layer 220. Since the first connecting portion 252 would not hit against all the membranes of the circuit layer 220, the impact sound generated by the keycap 250 could be mitigated, thereby avoiding the opposite effect on the force-distance curve of the key module 200.

As shown in FIGS. 15 and 16, the second circuit membrane 223 of the circuit layer 220 has a thickness t2, for example, ranged from 0.05 mm to 0.1 mm. In an embodiment, the thickness t2 could be about 0.075 mm. As shown in FIG. 15, if the distance H2 between the position P1 of the second bottom surface 252*s*1 (drawn with a dotted line) in the pressed state and an upper surface 223*u* of the second circuit membrane 223, not being pressed, is too small, the noise reduction effect is not good enough; if the distance H2 is too large, it will cause excessive interference resistance that may affect the force-distance curve. In an embodiment, the distance H2 is, for example, greater than the thickness t2 of the second circuit membrane 223, but could be less than or substantially equal to the thickness t2. In an embodiment, the distance H2 ranges, for example, between about 0.05 mm and about 0.2 mm, which could be 0.05 mm, 0.1 mm, 0.15 mm and 0.2 mm. In an embodiment, the thickness t2 is, for example, about 0.07 mm. As a result, the degree of such interference between the first connecting portion 252 and the circuit layer 220 could obtain beneficial effects on both of the noise reduction and the force-distance curve.

As shown in FIGS. 14-16, the first connecting portion 252 of the keycap 250 further has a third bottom surface 252*s*2 facing the circuit layer 220, and the second bottom surface 252*s*1 is closer to the circuit layer 220 than the third bottom surface 252*s*2. Furthermore, the first connecting portion 252 has an abutment element 2521 that protrudes from the third bottom surface 252*s*2 and has the aforementioned second bottom surface 252*s*1. The second bottom surface 252*s*1 is, for example, a terminal surface of the abutment element 2521. The larger the ratio of the area of the second bottom surface 252*s*1 of the abutment element 2521 to the area of the third bottom surface 252*s*2 is, the greater the interference resistance between the abutment element 2521 and the circuit layer 220 is, so that it could excessively or negatively impact the force-distance curve of the key module 200. If the ratio is too small, the noise reduction effect may not be significant. The ratio of the area of the second bottom surface **252*s*1 to the area of the third bottom surface 252*s*2 ranges between 40% and 70%, and it could obtain the effects of "not negatively affecting (not compromising) the force-distance curve of the key module 200**" and "noise reduction".

As shown in FIGS. 11 to 13, the base plate 210 has at least one hollow portion **210*a*. The area of the abutment element 2521 projecting on the circuit layer 220 along the pressing direction −Z of the lifting mechanism 230 at least partially overlaps the hollow portion 210*a* of the base plate 210. As a result, when the abutment element 2521 (or the second bottom surface 252*s*1) hits against the circuit layer 220, the stress of the base plate 210 applied by the abutment element 2521 could be reduced due to the base plate 210 having the hollow portion 210*a* right below the abutment element 2521. Moreover, the noise caused by the abutment element 2521 indirectly hitting against the base plate 210 could be reduced. In the present embodiment, the area of the abutment element 2521 projecting on the circuit layer 220 along the pressing direction −Z is completely within the coverage range of the hollow portion 210*a*, such that the stress which the abutment element 2521 applies on the base plate 210 is diminished or minimized, thereby minimizing the noise generated by the abutment element 2521 hitting on the base plate 210**.

In the present embodiment, the number of the first connecting portion 252 is plural. Depending on the implemented configuration, at least one of the first connecting portions 252 could have the abutment element 2521. The abutment element 2521 could interfere with at least one membrane structure of the circuit layer 220 in the pressed state, such that the circuit layer 220 could absorb vibration or impact during the operation of the key module 200 for further reducing the noise. When the keycap 250 moves up and down with the lifting mechanism 230, through the abutment element 2521 of the keycap 250 first touching the circuit layer 220, it could greatly reduce the vibration impact and collision sound. Furthermore, the soft landing effect provided by the abutment element 2521 upon interfering with the circuit layer 220 could effectively improve (or reduce) the noise generated by the key module 200 under the low-frequency vibration (e.g., less than 100 KHz) resulted from strokes or pressing the key module 200. The resultant noise under the low-frequency vibration is, for example, less than 60 dBA, even lower than 45 dBA.

In some embodiments, the key module 200 could be a multiple-width key. As compared to a standard key having the normal size, the keycap 250 of the key module 200 has a length W1 substantially greater than a width W2 of the keycap 250, as shown in FIG. 13. Since the length W1 of the keycap 250 in the present embodiment is substantially greater than the width W2 of the keycap 250, during the pressing of the key module 200, the keycap 250 is prone to wobble. If the keycap 250 is pressed at its corner, it could not be possible to reach the pressing stroke to turn on the circuit. In view of this, through the link bar 260 disposed along a longitudinal direction of the keycap 250, it could reduce the wobble and provide the keycap 250 with the stability in the longitudinal direction.

As shown in FIGS. 11 and 15, the link bar 260 could be pivotally connected with the first connecting portion 252 and movably disposed between the keycap 250 and the base plate 210. For example, one end of the link bar 260 could be pivotally connected with the first connecting portion 252 of the keycap 250, and the other end could be pivotally connected with the base plate 210. The link bar 260 could increase the stability in the process of the keycap 250 being pressed and released. As a result, even if the keycap 250 is a long-shaped keycap (for example, space key), the link bar 260 could increase the stability during the operation of the key module 200. The link bar 260 could be referred to as a balance bar. In another embodiment, the key module 200 is not provided with the link bar 260 under the circumstances of the keycap stability that is not required or necessary to be considered.

In addition, as shown in FIG. 11, the keycap 250 further includes at least one second connecting portion 253. The second connecting portion 253 is disposed on the bottom surface of the main body 254 toward the base plate 210, and is located inside the skirt portion 251 and the first connecting portion 252. The skirt 251 further surrounds the second connecting portion 253. Depending on the implemented configuration, at least one of the second connecting portions 253 could have the bottom surface features and/or abutment features similar to or the same as that of the first connecting portion 252, and therefore, the similarities will not be repeated here.

The reinforcement member 270 is disposed on the bottom surface of the main body 254 of the keycap 250, and connected with the second connecting portion 253 of the keycap 250. The reinforcement 270 could increase the strength and mechanical stability of the keycap 250. The reinforcement member 270 is, for example, a rod-shaped or plate-shaped metal structure, which is fixed in relatively central area of the keycap 250 and not connected with the base plate 210. That is, the link bar 260 surrounds outside the reinforcement member 270. As a result, even if the keycap 250 is a long-shaped keycap (the longer the length is, the greater the flexibility is), the sufficient strength of the keycap 250 could be maintained through the reinforcement member 270. The reinforcement member 270 is located in middle area of the keycap 250 to provide additional support, and it could enhance the structural strength in the middle area of the keycap 250 and therefore reduce the deformation of the keycap 250 when the keycap 250 is pressed.

Figure 17:
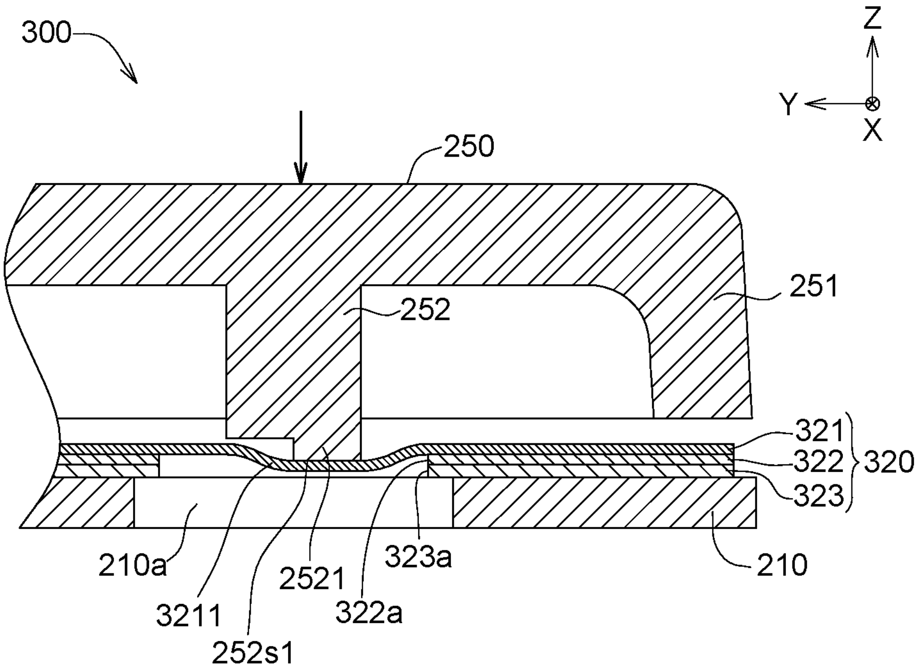
FIG. 17 is a partial cross-sectional view of a key module in the pressed state according to another embodiment of the present invention.

Referring to FIG. 17, FIG. 17 is a partial cross-sectional view of a key module 300 in the pressed state according to another embodiment of the present invention. The key module 300 has features similar to those of the key module 200 of the previous embodiments. Therefore, the element references and a part of the content of the previous embodiment are incorporated hereinafter, wherein the same reference numerals represent the same or similar components.

The difference between the structure of the key module 300 and the aforementioned key module 200 is that the structure of the circuit layer 320 of the key module 300 is different from that of the circuit layer 220 of the key module 200. The circuit layer 320 includes a first circuit membrane 321, a spacer 322 and a second circuit membrane 323. The spacer 322 is located between the first circuit membrane 321 and the second circuit membrane 323, and the first circuit membrane 321 is closer to the keycap 250 than the second circuit membrane 323. The spacer 322 has a first perforation portion **322*a*. One of the first circuit membrane 321 and the second circuit membrane 323 has a second perforation portion, and the other of the first circuit membrane 321 and the second circuit membrane 323 includes an interference portion. In the key module 300 of the present embodiment, the second circuit membrane 323 has a second perforation portion 323***a*, and the second circuit membrane 321 includes an interference portion 3211.

In addition, as shown in FIG. 17, the second bottom surface 252*s*1 is projected on the first perforation portion 322*a*, the second perforation portion 323*a*, and the interference portion 3211 in the pressing direction −Z. When the key module 300 is in the pressed state, at least one membrane of the circuit layer 320 that could act as the buffer is hit by the second bottom surface 252*s*1 of the first connecting portion 252, such that it could reduce the stroke sound caused by the keycap 250 and avoid negatively affecting the force-distance curve of the key module 300.

As described above, a key module provided in embodiments of the invention includes at least one of the following features:

(1) The abutment element might be disposed in the lifting mechanism, thereby reducing, without affecting the tactile feedbacks, the noise resulted from the high-frequency vibrations.

(2) The abutment element might be disposed on the keycap, thereby providing a soft landing effect when interfering with the circuit layer and effectively reducing the noise generated by the key module under low-frequency vibrations.

(3) The recess structure of the elastic body is provided with an abutment structure, thereby providing an improved noise reduction effect.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A key module, comprises:

a base plate;

a circuit layer disposed on the base plate, wherein the circuit layer has a hole recessed with respect to a surface of the circuit layer; and a lifting mechanism connected with the base plate and adapted to move up and down relative to the circuit layer;

a keycap disposed on the lifting mechanism and comprising a skirt portion and a connecting portion surrounded by the skirt portion, wherein the skirt portion and the connecting portion respectively have a first bottom surface and a second bottom surface facing the circuit layer, the second bottom surface is closer to the circuit layer than the first bottom surface, a portion of connecting portion is projected on a physical portion of the circuit layer along a pressing direction, and the second bottom surface of the connecting portion is located within the hole when the keycap is in a pressed state; and a link bar connected with the connecting portion.

2. The key module as claimed in claim 1, wherein the second bottom surface is in physical contact with the circuit layer when the key module is in a pressed state; the second bottom surface is not in physical contact with the circuit layer when the key module is in a released state.

3. The key module as claimed in claim 1, wherein the circuit layer comprises a plurality of membranes, one of the membranes has a perforation portion, another one of the membranes has an interference portion, and the second bottom surface is projected on the perforation portion and the interference portion in the pressing direction.

4. The key module as claimed in claim 1, wherein the circuit layer comprises a first circuit membrane, a spacer and a second circuit membrane, the spacer is located between the first circuit membrane and the second circuit membrane, the spacer has a first perforation portion, one of the first circuit membrane and the second circuit membrane has a second perforation portion, the other of the first circuit membrane and the second circuit membrane has an interference portion, and the second bottom surface is projected on the first perforation portion, the second perforation portion and the interference portion along the pressing direction.

5. The key module as claimed in claim 1, wherein the connecting portion further has a third bottom surface facing the circuit layer, the second bottom surface is closer to the circuit layer than the third bottom surface, and a ratio of an area of the second bottom surface to an area of the third bottom surface ranges from 40% to 70%.

6. The key module as claimed in claim 1, wherein the connecting portion comprises an abutment element, and the abutment element has the second bottom surface.

7. The key module as claimed in claim 1, wherein the base plate has a hollow portion, the connecting portion comprises an abutment element having the second bottom surface, and a projection area of the abutment element projected on the circuit layer in the pressing direction at least partially overlaps the hollow portion.

8. The key module as claimed in claim 1, further comprises:

an elastic body located between the keycap and the circuit layer and comprising a top surface, a groove recessed with respect to the top surface and an abutment structure located on a groove bottom surface of the groove, wherein the abutment structure is in physical contact with the keycap when the key module is in a pressed state.

9. The key module as claimed in claim 1, wherein the keycap further comprises a main body, the skirt portion is disposed along periphery of the main body and extends toward the base plate, the connecting portion is disposed on a bottom surface of the main body facing the base plate and has a third bottom surface, the connecting portion comprises an abutment element protruding with respect to the third bottom surface and being projected on a perforation portion and an interference portion of the circuit layer along the pressing direction.

10. A key module, comprises:

a base plate;

a circuit layer disposed on the base plate;

a keycap disposed on the circuit layer; and a lifting mechanism having two sides respectively connected to the base plate and the keycap;

wherein one of the two sides includes an abutment element at a position corresponding to a niche above the circuit layer in a pressing direction;

wherein the lifting mechanism comprises an outer bracket and an inner bracket pivotally connected with the outer bracket, the outer bracket comprises a rod portion, the rod portion is provided with the niche, the abutment element located on the rod portion and is provided in the niche, and a portion of the circuit layer is arranged underneath the niche;

wherein the rod portion has a long axis substantially parallel to an upper surface of the base plate in a released state.

11. The key module as claimed in claim 10, wherein the abutment element is integrally disposed on the lifting mechanism to be in contact with the circuit layer.

12. The key module as claimed in claim 10, wherein the base plate has a hollow portion, and a projection area of the abutment element projected on the circuit layer in the pressing direction at least partially overlaps the hollow portion.

13. The key module as claimed in claim 10, wherein the lifting mechanism comprises a rod body and a surface facing the circuit layer, the rod body and the abutment element protrude from the surface, and a protrusion height of the rod body with respect to the surface is greater than a protrusion height of the abutment element with respect to the surface.

14. The key module as claimed in claim 10, wherein the abutment element disposed on the lifting mechanism has a curved surface interfering with the circuit layer.

15. The key module as claimed in claim 10, further comprises:

an elastic body located between the keycap and the circuit layer and comprising a top surface, a groove recessed with respect to the top surface and an abutment structure disposed on a groove bottom surface of the groove, wherein the abutment structure is in physical contact with the keycap when the key module is in a pressed state.

16. The key module as claimed in claim 10, wherein the abutment element comprises an insulating buffer material with a block pattern or a strip pattern.

17. The key module as claimed in claim 10, wherein portion of the circuit layer presses in a direction substantially perpendicular to the long axis of the rod portion, and the abutment element contacts the circuit layer and the outer bracket.

18. The key module as claimed in claim 10, wherein the abutment element is disposed on a surface of the rod portion facing the circuit layer.

19. A key module, comprises:

a base plate;

a circuit layer disposed on the base plate;

a keycap disposed on the circuit layer; and a lifting mechanism having two sides respectively connected to the base plate and the keycap, wherein one of the two sides includes an abutment element at a position corresponding to the circuit layer and between two protrusions;

wherein the lifting mechanism comprises an outer bracket and an inner bracket movably connected with the outer bracket, the outer bracket is provided with a rod portion, the abutment element and the two protrusions are arranged on the rod portion, and a thickness of the protrusion is greater than a thickness of the abutment element in a pressing direction;

wherein two opposite ends of the rod portion are aligned in a direction substantially parallel to an upper surface of the base plate in a released state of the key module.

20. The key module as claimed in claim 19, wherein a niche is disposed between the two protrusions at a position corresponding to the circuit layer in the pressing direction, the protrusions protrude from a sunken surface of the niche, and a height of the protrusion from the sunken surface is greater than a height of the abutment element from the sunken surface.

21. The key module as claimed in claim 19, wherein the two ends of the rod portion are coupled to the base plate.

* * * * *